US010181977B2

(12) United States Patent
Lee et al.

(10) Patent No.: US 10,181,977 B2
(45) Date of Patent: *Jan. 15, 2019

(54) CROSS-STRATUM OPTIMIZATION PROTOCOL

(71) Applicant: Futurewei Technologies, Inc., Plano, TX (US)

(72) Inventors: Young Lee, Plano, TX (US); Yangsong Xia, Richardson, TX (US)

(73) Assignee: Futurewei Technologies, Inc., Plano, TX (US)

(*) Notice: Subject to any disclaimer, the term of this patent is extended or adjusted under 35 U.S.C. 154(b) by 139 days.

This patent is subject to a terminal disclaimer.

(21) Appl. No.: 14/876,313

(22) Filed: Oct. 6, 2015

(65) Prior Publication Data
US 2016/0028583 A1 Jan. 28, 2016

Related U.S. Application Data

(63) Continuation of application No. 13/216,808, filed on Aug. 24, 2011, now Pat. No. 9,184,983.
(Continued)

(51) Int. Cl.
G06F 15/173 (2006.01)
H04J 3/16 (2006.01)
(Continued)

(52) U.S. Cl.
CPC .......... H04L 41/0803 (2013.01); H04L 41/04 (2013.01); H04L 43/08 (2013.01);
(Continued)

(58) Field of Classification Search
CPC ......... H04L 41/04; H04L 45/64; H04L 43/08; H04L 67/1029; H04L 69/32; H04L 41/0803
(Continued)

(56) References Cited

U.S. PATENT DOCUMENTS 6,314,093 B1* 11/2001 Mann ............... H04L 45/12 370/254
7,006,472 B1* 2/2006 Immonen ......... H04L 29/12009 370/332
(Continued)

FOREIGN PATENT DOCUMENTS

CN 1443431 A 9/2003
CN 101163120 A 4/2008
(Continued)

OTHER PUBLICATIONS

Foreign Communication From a Counterpart Application, PCT Application No. PCT/CN2011/079001, International Search Report dated Dec. 1, 2011, 4 pages.
(Continued)

Primary Examiner — Aftab N. Khan
(74) Attorney, Agent, or Firm — Conley Rose, P.C.

(57) ABSTRACT

An apparatus comprising an application cross-stratum optimization (CSO) gateway (ACG) coupled to an application layer that handles a plurality of servers, a network CSO gateway (NCG) coupled to a network layer that handles a plurality of network nodes and configured to communicate with the ACG using a CSO protocol (CSOP), and a CSO interface established between the ACG and the NCG that enables the exchange of a plurality of CSOP messages to allow joint application-network resource allocation, provisioning, and optimization. Also disclosed is a network apparatus implemented method comprising sending a user profile from a user plane to an application plane, sending an application profile from the application plane to a network plane via a CSO interface between an ACG and a NCG, and sending network capability information from the network plane to the application plane via the CSO interface.

20 Claims, 17 Drawing Sheets

Related U.S. Application Data

(60) Provisional application No. 61/377,361, filed on Aug. 26, 2010, provisional application No. 61/377,352, filed on Aug. 26, 2010.

(51) Int. Cl.
*H04L 12/24* (2006.01)
*H04L 12/715* (2013.01)
*H04L 29/08* (2006.01)
*H04L 12/26* (2006.01)

(52) U.S. Cl.
CPC .......... *H04L 45/64* (2013.01); *H04L 67/1029* (2013.01); *H04L 69/32* (2013.01); *H04L 43/00* (2013.01)

(58) Field of Classification Search
USPC ........ 709/238, 245, 217, 218; 370/389, 401, 370/469
See application file for complete search history.

(56) References Cited

U.S. PATENT DOCUMENTS

| | | | |
|---|---|---|---|
| 7,269,185 B2* | 9/2007 | Kirkby | H04L 41/5022 370/230 |
| 7,454,489 B2* | 11/2008 | Chauffour | H04L 67/1027 709/223 |
| 8,447,881 B2* | 5/2013 | Paramasivam | G06F 9/5033 709/203 |
| 2001/0053145 A1 | 12/2001 | Willars et al. | |
| 2002/0188736 A1* | 12/2002 | Jarvensivu | H04L 63/0853 709/229 |
| 2003/0177281 A1 | 9/2003 | McQuillan et al. | |
| 2003/0200336 A1* | 10/2003 | Pal | H04L 29/06027 709/246 |
| 2004/0022191 A1 | 2/2004 | Bernet et al. | |
| 2007/0249321 A1 | 10/2007 | Kumar et al. | |
| 2007/0250592 A1 | 10/2007 | Reckamp et al. | |
| 2007/0266134 A1 | 11/2007 | Shyy et al. | |
| 2008/0270534 A1 | 10/2008 | Xia et al. | |
| 2008/0301765 A1 | 12/2008 | Nicol et al. | |
| 2009/0046631 A1 | 2/2009 | Meylan et al. | |
| 2009/0109893 A1 | 4/2009 | Gopal | |
| 2009/0147684 A1* | 6/2009 | Majidi-Ahy | H04L 12/66 370/236 |
| 2009/0168787 A1 | 7/2009 | Ansari et al. | |
| 2009/0196308 A1 | 8/2009 | Pan et al. | |
| 2009/0328048 A1 | 12/2009 | Khan et al. | |
| 2010/0150161 A1 | 6/2010 | Saksena et al. | |
| 2010/0177769 A1* | 7/2010 | Barriga | H04L 29/12188 370/352 |
| 2010/0250668 A1* | 9/2010 | Toebes | H04L 67/1021 709/203 |
| 2011/0185052 A1 | 7/2011 | Nakahira | |
| 2012/0026869 A1* | 2/2012 | Wang | H04L 41/5003 370/230 |
| 2012/0054346 A1 | 3/2012 | Lee et al. | |
| 2012/0136926 A1 | 5/2012 | Dillon | |
| 2012/0207116 A1* | 8/2012 | Chen | H04L 43/0805 370/329 |
| 2013/0003613 A1* | 1/2013 | Raleigh | G06Q 10/06375 370/259 |
| 2013/0111038 A1 | 5/2013 | Girard | |

FOREIGN PATENT DOCUMENTS

| | | |
|---|---|---|
| CN | 101651658 A | 2/2010 |
| EP | 2079197 A1 | 7/2009 |
| JP | 2011155600 A | 8/2011 |
| WO | 0211459 A1 | 2/2002 |

OTHER PUBLICATIONS

Foreign Communication From a Counterpart Application, PCT Application No. PCT/CN2011/079001, Written Opinion dated Dec. 1, 2011, 4 pages.
Foreign Communication From a Counterpart Application, PCT Application No. PCT/CN2011/079006, International Search Report dated Dec. 1, 2011, 3 pages.
Foreign Communication From a Counterpart Application, PCT Application No. PCT/CN2011/079006, Written Opinion dated Dec. 1, 2011, 5 pages.
Foreign Communication From a Counterpart Application, European Application No. 11819436.4, Extended European Search Report dated Jul. 4, 2013, 8 pages.
Foreign Communication From a Counterpart Application, European Application No. 11819438.0, Extended European Search Report dated Jul. 4, 2013, 8 pages.
Foreign Communication From a Counterpart Application, Chinese Application No. 201180040699.9, Chinese Office Action dated Dec. 1, 2014, 4 pages.
Foreign Communication From a Counterpart Application, Chinese Application No. 201180040699.9, Chinese Search Report dated Sep. 23, 2014, 2 pages.
Foreign Communication From a Counterpart Application, Chinese Application No. 201180040637.8, Chinese Search Report dated Oct. 21, 2014, 2 pages.
Foreign Communication From a Counterpart Application, Chinese Application No. 201180040637.8, Chinese Office Action dated Oct. 30, 2014, 5 pages.
Office Action dated May 7, 2013, 25 pages, U.S. Appl. No. 13/216,808, filed Aug. 24, 2011.
Notice of Allowance dated Jul. 7, 2015, 22 pages, U.S. Appl. No. 13/216,808, filed Aug. 24, 2011.
Office Action dated Apr. 16, 2014, 16 pages, U.S. Appl. No. 13/216,808, filed Aug. 24, 2011.
Office Action dated Sep. 25, 2013, 25 pages, U.S. Appl. No. 13/216,808, filed Aug. 24, 2011.
Notice of Allowance dated Sep. 25, 2014, 9 pages, U.S. Appl. No. 13/216,805, filed Aug. 24, 2011.
Office Action dated Sep. 9, 2014, 4 pages, U.S. Appl. No. 13/216,805, filed Aug. 24, 2011.
Office Action dated Feb. 25, 2014, U.S. Appl. No. 13/216,805, filed Aug. 24, 2011.
Lee, Y., "Cross Stratum Optimization (CSO): Networking the Clouds," Cloud Computing and Cross Stratum, Optimization Workshop, Daejeon, Korea, Jun. 7-8, 2011, 28 pages.
Christodoulopoulos, K., et al., "Cross Layer Optimization of Static Lightpath Demands in Transparent WDM Optical Networks," Department of Computer Engineering and Informatics, Jun. 10-12, 2009, 5 pages.
Meng, et al., "Improving the Scalability of Data Center Networks with Traffic-Aware Virtual Machine Placement," IEEE INFOCOM 2010 Proceedings, May 2010, 9 pages.
"Series Y: Global Information Infrastructure, Internet Protocol Aspects and Next Generation Networks, Next Genertation Networks—Framework and Functional Architecture Models, General Principles and General Reference Model for Next Generation Networks," ITU-T, Telecommunication Standardization Sector of ITU, Y.2011, Oct. 2004, 34 pages.
"Series Y: Global Information, Infrastructure, Internet Protocol Aspects and Next-Generation Networks, Next Generation Networks—Frameworks and Functional Architecture Models, Functional Requirements and Architecture of Next Generation Networks," ITU-T, Telecommunication Standardization Sector of ITU, Y.2012, Apr. 2010, 96 pages.
"Series Y: Global Information Infrastructure and Internet Protocol Aspects, Internet Protocol Aspects—Quality of Service and Network Performance, Network Performance Objectives for IP-Based Services," ITU-T, Telecommunication Standardization Sector of ITU, Y.1541, May 2002, 34 pages.
Blunk, L., et al., "MRT Routing Information Export Format," draft-ietf-grow-mrt-13.txt, Sep. 9, 2010, 33 pages.

(56) References Cited

OTHER PUBLICATIONS

Lee, Y., et al., "Problem Statement for Cross-Layer Optimization." Draft-lee-cross-layer-optimization-problem-00.txt, Jul. 4, 2010, 14 pages.
Lee, Y., et al., "Problem Statement for Cross-Layer Optimization," draft-lee-cross-layer-optimization-problem-01.txt, Jul. 12, 2010, 19 pages.
Lee, Y., et al., "Research Proposal for Cross Stratum Optimization (CSO) between Data Centers and Networks," draft-lee-cross-stratum-optimization-datacenter-00.txt, Mar. 3, 2011, 16 pages.
Lee, Y., et al., "Problem Statement for Network Stratum Query," draft-lee-network-stratum-query-problem-02.txt, Apr. 20, 2011, 15 pages.
Lee, Y., et al., "Problem Statement for Network Stratum Query," draft-lee-network-stratum-query-problem-01.txt, Oct. 20, 2010, 15 pages.
So, N., et al., "Problem Statement for Network Aware Application Resource Assignment and Mobility (NA-ARAM) in Data Center Environments," draft-so-network-aware-application-problem-02.txt, Apr. 20, 2011, 15 pages.
Berger, L., Ed., et al., "Generalized Multi-Protocol Label Switching (GMPLS) Signaling Functional Description," RFC 3471, Jan. 2003, 31 pages.
Bradner, S., et al., "Key Words for Use in RFCs to Indicate Requirement Levels," RFC 2119, Mar. 1997, 4 pages.
Blunk, L., et al., "Routing Policy Specification Language next generation (RPSLng)," RFC 4012, Mar. 2005, 17 pages.
Chan, K., "COPS Usage for Policy Provisioning (COPS-PR)," RFC 3084, Mar. 2001, 35 pages.
Farrel, A., et al., "A Path Computation Element (PCE)—Based Architecture," RFC 4655, Aug. 2006, 38 pages.
Hares, S., et al., "Administrative Domains and Routing Domains a Model for Routing in the Internet," RFC 1136, Dec. 1989, 11 pages.
Harrington, D., et al., "An Architecture for Describing SNMP Management Frameworks," RFC 2261, Jan. 1998, 57 pages.
Herzog, S., et al., "RSVP Extensions for Policy Control," RFC 2750, Jan. 2000, 14 pages.
Hinden, R., et al., "IPv6 Testing Address Allocation," RFC 2471, Dec. 1998, 6 pages.
Le Roux, JL., Ed., et al., "IS-IS Protocol Extensions for Path Computation Element (PCE) Discovery," RFC 5089, Jan. 2008, 16 pages.
Le Roux, JL., Ed., et al., "OSPF Protocol Extensions for Path Computation Element (PCE) Discovery," RFC 5088, Jan. 2008, 19 pages.
Moore, B., et al., "Policy Core Information Model—Version 1 Specification," RFC 3060, Feb. 2001, 101 pages.
Oki, E., et al., "Framework for PCE-Based Inter-Layer MPLS and GMPLS Traffic Engineering," RFC 5623, Sep. 2009, 35 pages.
Schulzrinne, H., et al., "Common Policy: A Document Format for Expressing Privacy Preferences," RFC 4745, Feb. 2007, 33 pages.
Shiomoto, K., et al., "Requirements for GMPLS-Based Multi-Region and Multi-Layer Networks (MRN/MLN)," RFC 5212, Jul. 2008, 29 pages.
Vasseur, JP., Ed., et al., "Path Computation Element (PCE) Communication Protocol (PCEP)," RFC 5440, Mar. 2009, 88 pages.
Vasseur, JP., Ed., et al., "A Backward-Recursive PCE-Based Computation (BRPC) Procedure to Compute Shortest Constrained Inter-Domain Traffic Engineering Label Switched Paths," RFC 5441, Apr. 2009, 19 pages.
Walker, J., et al., "Common Open Policy Service (COPS) Over Transport Layer Security (TLS)," RFC 4261, Dec. 2005, 15 pages.
Wijnen, B., et al., "View-Based Access Control Model (VACM) for the Simple Network Management Protocol (SNMP)," RFC 2265, Jan. 1998, 37 pages.
Yavatkar, R., et al., "A Framework for Policy-Based Admission Control," RFC 2753, Jan. 2000, 21 pages.
"LS/r on updated reference table of ITU-T Recommendations to be used for conformity and interoperability testing (SG16-LS35, SG16-LS45, SG15-LS25) [from ITU-T SG11]," SG16-TD168/GEN, Study Group 16, Jul. 9-20, 2018, 1 page.
Series Q: Switching and Signalling, Signalling requirements and protocols for the NGN—Resource control protocols, Interface and signalling requirements and specification for cross stratum optimization, ITU-T, Q.3316, Feb. 2016, 38 pages.

* cited by examiner

1300

| Source IPv4 address | 1302 |
| Destination IPv4 address | 1304 |
| Destination IPv4 address | 1304 |
| Destination IPv4 address | 1304 |
| Destination IPv4 address | 1304 |

1900

| Path Identifier | 1902 |
|---|---|
| Application Source IPv4 address | 1904 |
| Network Source IPv4 address | 1906 |
| Application Destination IPv4 address | 1908 |
| Network Source IPv4 address | 1910 |
| Estimated Bandwidth | 1912 |

| 2002 | 2004 | 2006 | 2008 | 2010 | 2012 |
|---|---|---|---|---|---|
| L | NUM SOURCE | NUM DESTIN | V | Flag | Reserved |
| Service Request ID Number ||||| 2014 |
| Optional TLVs |||||  |

| | |
|---|---|
| Application Source #1 IPv4 address | 2202 |
| Network Source #1 IPv4 address | 2204 |
| Application Destination #1 IPv4 address | 2206 |
| Network Source #1 IPv4 address | 2208 |
| Available Bandwidth | 2210 |
| Application Source #2 IPv4 address | 2212 |
| Network Source #2 IPv4 address | 2214 |
| Application Destination #2 IPv4 address | 2216 |
| Network Source #2 IPv4 address | 2218 |
| Second Available Bandwidth | 2220 |

FIG. 22

CROSS-STRATUM OPTIMIZATION PROTOCOL

CROSS-REFERENCE TO RELATED APPLICATIONS

The present application is a continuation of U.S. patent application Ser. No. 13/216,808 filed Aug. 24, 2011 by Young Lee et al., and entitled "Cross-Stratum Optimization Protocol," which claims priority to U.S. Provisional Patent Application 61/377,361, filed Aug. 26, 2010 by Young Lee et al., and entitled "Method and System for Cross-Stratum Optimization," and U.S. Provisional Patent Application 61/377,352, filed Aug. 26, 2010 by Young Lee et al., and entitled "Cross-Stratum Optimization Protocol," all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network carriers, also referred to sometimes as telecommunications operators or communications service providers, that run existing networks desire to optimize the network utilization for passing traffic, such as Internet Protocol (IP) traffic, over a physical network, e.g., across the network layers 1 to 5. The optimized traffic may include traffic for triple play services (e.g., Video, Voice, and/or Data) and any type of bulk data. In existing networks, end-to-end services are typically set-up by Operational Support Systems (OSS) or provider specific network management service applications. Network carriers have suggested two different scenarios for optimizing network utilization and traffic: optimizing existing network services and enabling new/emerging network application services.

SUMMARY

In one embodiment, the disclosure includes an apparatus comprising an application cross-stratum optimization (CSO) gateway (ACG) coupled to an application layer that handles a plurality of servers, a network CSO gateway (NCG) coupled to a network layer that handles a plurality of network nodes and configured to communicate with the ACG using a CSO protocol (CSOP), and a CSO interface established between the ACG and the NCG that enables the exchange of a plurality of CSOP messages to allow joint application-network resource allocation, provisioning, and optimization.

In another embodiment, the disclosure includes a network component comprising a receiver configured to receive a first CSOP message via a CSO interface established between an application plane and a network plane, and a plane controller configured to enable CSO between the application plane and the network plane by processing the first CSOP message to allocate, provision, or optimize joint application-network resource, and a transmitter configured to send a second CSOP message via the CSO interface in response to the first CSOP message or for CSO purpose.

In yet another embodiment, the disclosure includes a network apparatus implemented method comprising sending a user profile from a user plane to an application plane, sending an application profile from the application plane to a network plane via a CSO interface between an ACG and a NCG, and sending network capability information from the network plane to the application plane via the CSO interface.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 19 is a schematic diagram of another embodiment of an optional TLV.

FIG. 20 is a schematic diagram of an embodiment of a virtual network topology (VNT) object.

FIG. 22 is a schematic diagram of another embodiment of an optional TLV.

DETAILED DESCRIPTION

Figure 1:
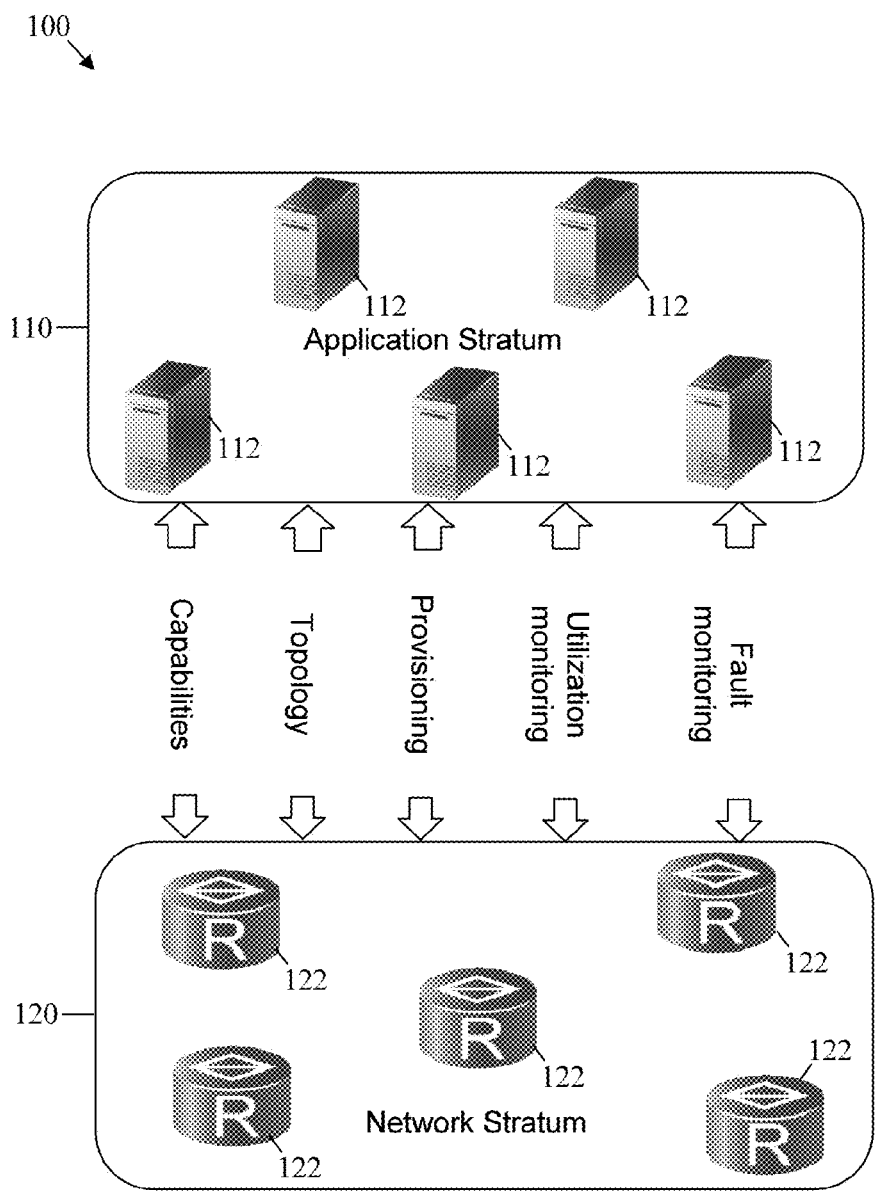
FIG. 1 is a schematic diagram of an embodiment of a CSO architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The provisioning and operation of new/emerging applications may involve resolving the server selection (SS) problem in the application stratum as well as the network provisioning in the underlying network stratum. The application stratum may include the applications and services implemented or running over the application and network layer, and the network stratum may include the transport, network, link, and physical layers or combinations thereof. Handling and coordinating service provisioning across both the application stratum and the network stratum is different from handling traditional services, such as network provisioning of end-to-end telecommunications services.

The CSO may enable new services, e.g., using multi-domain and/or multi-device optimization. The new services may include file distribution systems, streaming video services, video conferencing services, and grid computing. These services may use both mobile devices and fixed devices. File distribution systems and services began by accelerating the download of web pages, such as those with images, and then expanded to include software, audio, and video file delivery. The streaming services may be separated in two types, live and on-demand services. Multiple variants between these two types may also be created when pause or replay functionality is included in a live streaming service. The live streaming may be the case where the client is willing to receive the stream at its current play out point rather than at some pre-existing start point. On-demand services may provide additional technical challenges. Service providers may wish to avoid long start up service delays to retain customers, while at the same time batch together requests to save on server costs. Video conferencing moves from the point-to-multipoint scenario of streaming content distribution to a multipoint-to-multipoint situation. Further, there may be an additional hard Quality of Service (QoS) constraint on latency. Grid computing may have requirements for substantially large file transfer with reduced fan and larger file sizes.

One problem in interactions between the application stratum and the network stratum is the lack of an open standard interface that allows a proxy signaling between application and network strata. This may limit cross-stratum information sharing, feedback mechanism between strata, and integrated/synchronized resource allocation and re-configuration. This lack of coordination between the application and network strata may increase the potential for resource wastage, which may translate to a higher cost for both application and network operations.

Disclosed herein is a system and methods for providing a protocol specification to support CSO, which is referred to herein as a CSOP. The CSO may involve the integrated optimization of the application and network resources by providing an interface for interactions and exchanges between the two strata. The CSO may also include coordinating both application and network resources. The CSO may be achieved independent of any possible optimization for existing applications or services that run on a network.

Some of the terms used and described below with respect to CSO features include: ACG, NCG, CSOP, and profile. The ACG may be a CSO entity in the application stratum that is responsible for gathering application resources load and utilization, making resource allocation decisions, and interacting with the NCG. The NCG may be a CSO entity in the network stratum that is responsible for interacting with the ACG, triggering service request function to transport network entity responsible for provisioning, configuration, path estimation/computation and other network management/control functions. The CSOP may be a protocol that runs on an interface between an ACG and a NCG, as described further below. The profile may comprise information that describes the service requirement for an application. The profile may be generated by an ACG and communicated to a NCG via the CSOP, as described herein.

FIG. 1 illustrates embodiments of a CSO architecture 100. The CSO architecture 100 may comprise an application stratum 110 and a network stratum 120. The application stratum 110 may involve communications between a plurality of servers 112, which may be configured to implement or run applications for end-users or customers (not shown). The network stratum 120 may involve communications between a plurality of network nodes 122, such as bridges, routers, and/or switches, for forwarding data, e.g., packets, associated with the applications. The servers 112 may be located in a data center and the network nodes 122 may be located in a network coupled to the data center. The servers 112 may communicate with the network nodes 122 to enable servicing the user applications and forwarding or transporting the associated data. The CSO may be implemented to optimize the different operations of the servers 112 and the network nodes 122. The servers 112 may be located in the same data center or a sub-set of servers 112 may be located in multiple data centers.

In an embodiment, the data centers used to provide application services, such as cloud computing and other cloud services, at the application stratum 110 to the end-users may be distributed geographically around the network stratum 120. Thus, many decisions made in the control and management of application services, such as where to instantiate another service instance or to which data center a new client is assigned, may have a significant impact on the state of the network. The capabilities and state of the network may also have an impact on application performance.

Currently application decisions may be made with little or no information concerning the underlying network used to deliver those services. Hence, such decisions may be sub-optimal from both application and network resource utilization and from the achievement of QoS objectives. The CSO may provide a method and system to coordinate resource allocation between the application stratum 110 and the network stratum 120, e.g., in the context of cloud computing and data center networks. For instance, the CSO objectives may support network stratum 110 query from application, joint provisioning between application and network, and/or joint re-allocation of resources upon anomaly in both application and network. The CSO objectives may also provide application-aware network, network-aware application, and global load balancing capability.

Some of the objectives for optimizing the operations and/or interactions between the application stratum 110 and the network stratum 120, e.g., between the servers 112 and the network nodes 122, may include improving network capabilities, topology, provisioning, utilization monitoring, fault monitoring, or combinations thereof. For instance, the CSO objectives 100 may improve the exchange of either or both network capabilities or application demand/resource information, topology and/or traffic-engineering related information between the layers (virtualization/abstraction), or both. The CSO objectives may also improve initiating service instantiation of application to network with profile exchange (provisioning), exchanging application/network congestion/failure information (monitoring), or both.

Figure 2:
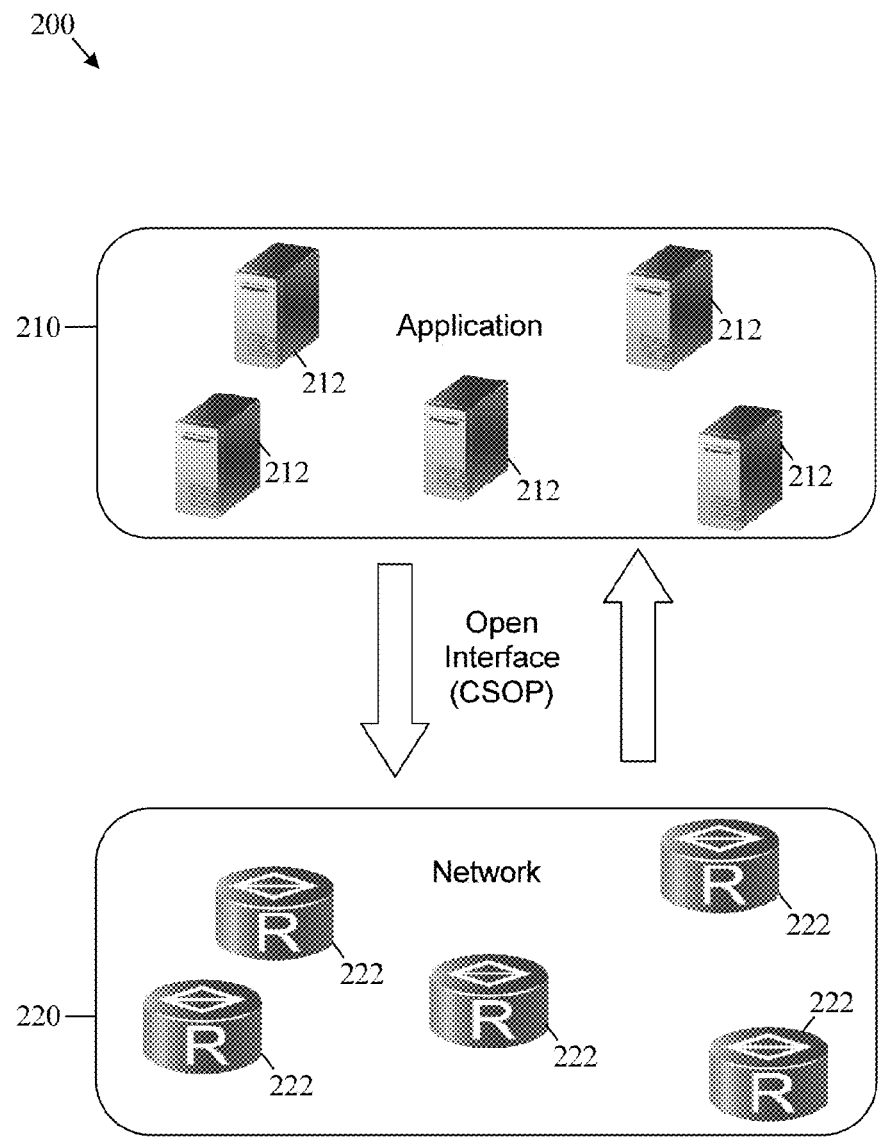
FIG. 2 is a schematic diagram of another embodiment of a CSO architecture.

FIG. 2 illustrates another embodiment of a CSO architecture 200 that may comprise an application stratum 210 and a network stratum 220. The application stratum 210 may handle communications between a plurality of servers 212 and the network stratum 220 may handle communications between a plurality of network nodes 222, which may be substantially similar to the servers 112 and the network nodes 122, respectively. The CSO architecture 200 may also comprise a CSO interface that allows better interactions and/or communications between the servers 112 and/or other components (not shown) of the application stratum 210 and the network nodes 122 and/or other components (not shown) of the network stratum 220. The CSO interface may be an open interface between the two strata and may enable CSO features using the CSOP, as described below. At the application stratum 210, the open interface may allow client/customer identification of some type, e.g., IP address, server types and identification, application data flows and QoS requirements that may be statistical in nature and vary over time, and/or server load and fault conditions. At the network stratum 220, the open interface may allow exchanging network topology, client and server locations within that topology, network capabilities and capacities with respect to QoS, bandwidth, latency information, and/or other network related features, network load and fault conditions, or combinations thereof.

Figure 3:
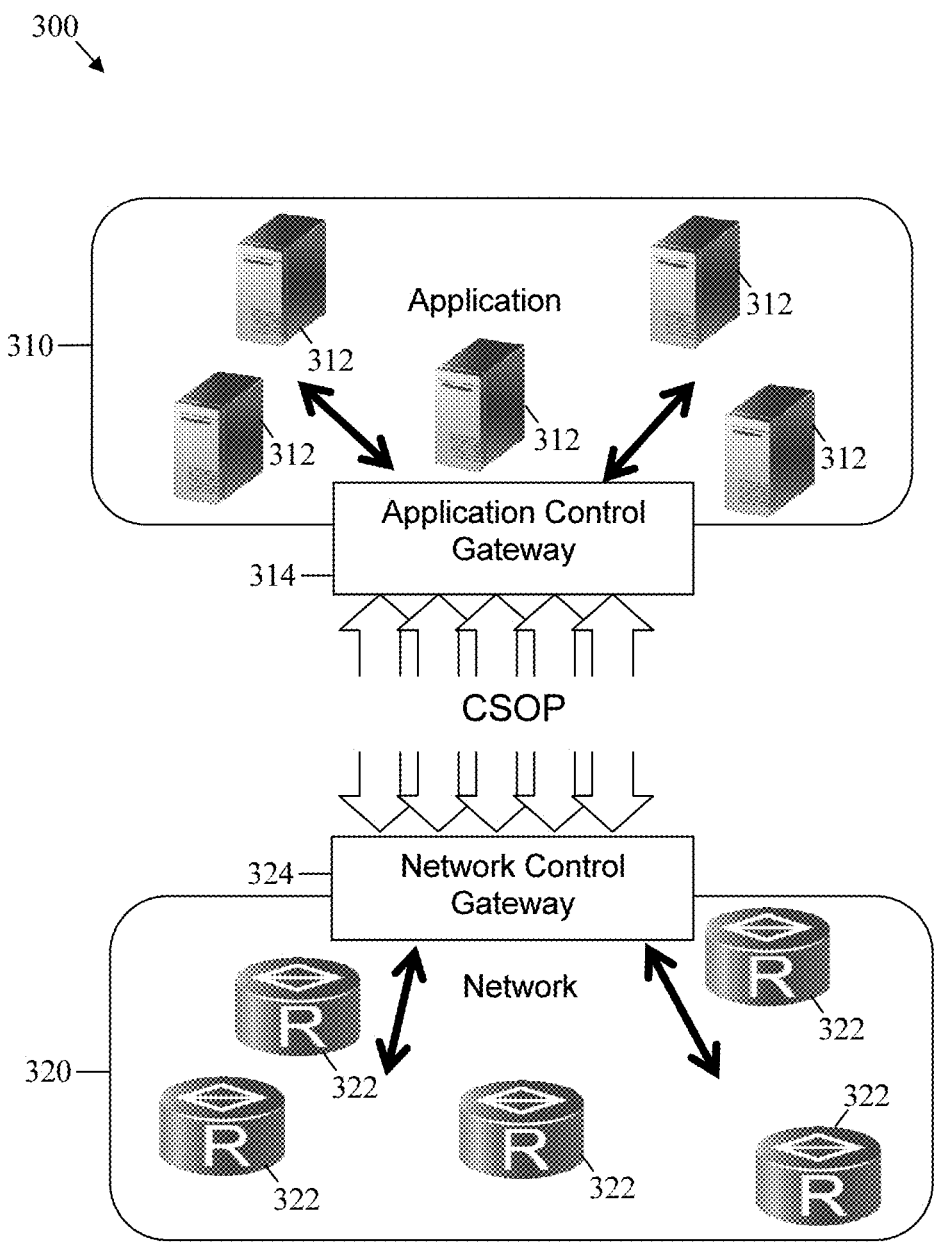
FIG. 3 is a schematic diagram of another embodiment of a CSO architecture.

FIG. 3 illustrates another embodiment of a CSO architecture 300 that may comprise an application stratum 310 and a network stratum 320. The application stratum 310 may include interactions between a plurality of servers 312 and the network stratum 320 may include interactions between a plurality of network nodes 322, which may be substantially similar to the servers 112 and the network nodes 122, respectively. The CSO architecture 300 may also comprise a CSO interface that may be established between an ACG 314 at the application stratum 310 and a NCG 324 at the network stratum 320.

The ACG 314 may be configured to access application related data and processes at the application stratum 310, communicate with the NCG 324 via the CSO interface, and provide application resource information and access limitations to external entities at the network stratum 320 entities. The NCG 324 may be configured to access network related data (at the network stratum 320), communicate with the ACG 314 via the CSO interface, communicate with network processes such as admission control, resource reservation, and/or connection processing, and provide network resource information and access limitations to the application stratum 310 entities. Additionally, the ACG 314 and the NCG 324 may communicate with the servers 312 and the network nodes 322, respectively. The CSO interface between the ACG 314 and the NCG 324 may support using the CSOP to enable the different functionalities of the ACG 314 and NCG 324 above and related communications, e.g., signaling, messaging, and information exchange.

Figure 4:
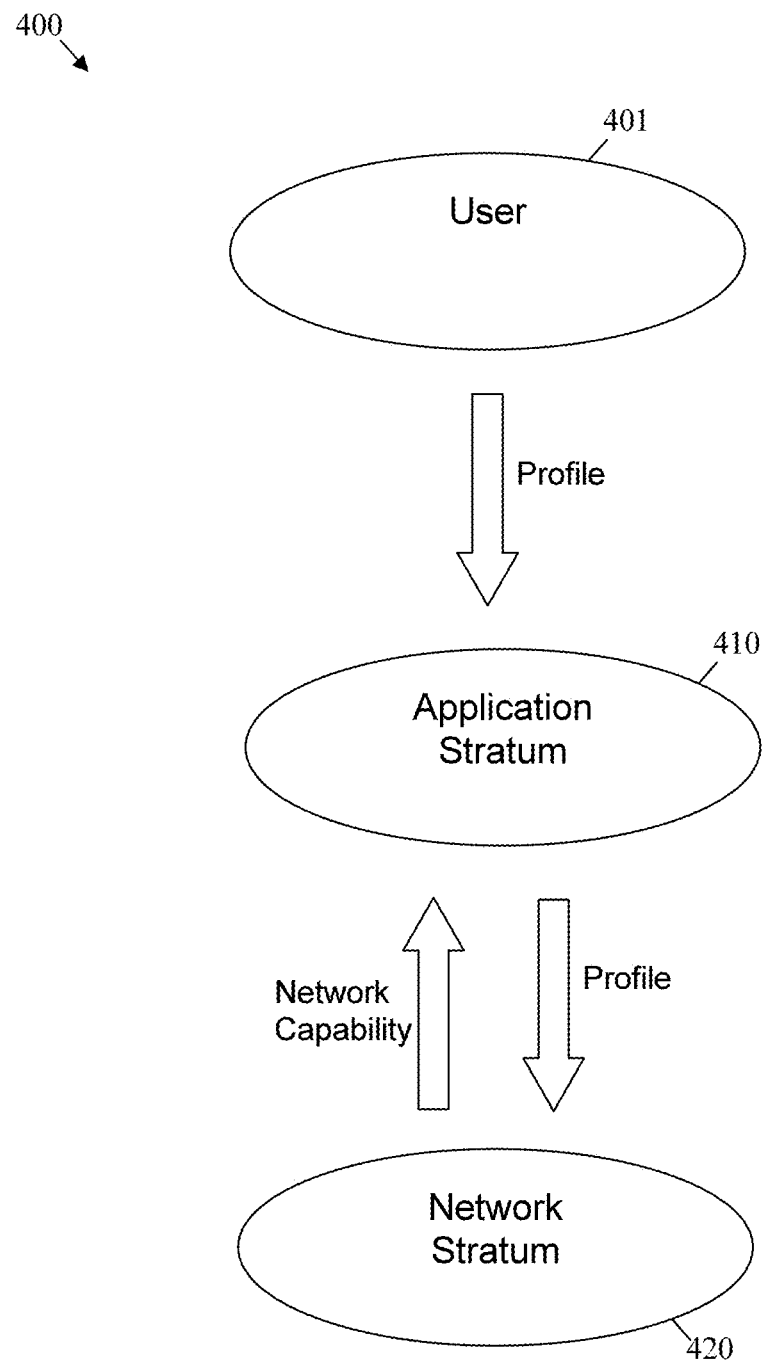
FIG. 4 is a schematic diagram of a CSOP scheme.

FIG. 4 illustrates an embodiment of a CSOP scheme 400, which may be implemented using the CSO interface between an ACG and a NCG, e.g., in the CSO architectures above. A user profile may be sent from a user or user plane 401 to an application stratum 410. The user profile may define characteristics of the user and may comprise a user identifier, a user device identifier, user device codec information if applicable, user preference if available, user capability, or combinations thereof. The user identifier may be a unique user identifier (ID) such as a virtual ID. The user device identifier may correspond to the address, e.g. IP and/or Media Access Control (MAC) address, for each user device. There may be multiple user devices depending on the location of the user. The user preference may be known a priori, such as preferred server location for the user. The user capability may include the maximum bandwidth that the user device can handle, e.g., for uplink and/or downlink.

The application stratum 410 may then forward the user profile, e.g., after processing, to a network stratum 420. Additionally or alternatively, the application stratum 410 may forward an application profile to a network stratum 420. The application profile may be obtained based on the user profile and may define characteristics of the application for the user. The application profile may comprise at least one of a security profile, a location profile, a QoS profile, a connectivity profile, a directionality profile, a bandwidth profile, a duration of service profile, and a restoration profile.

The security profile may comprise dedicated end-to-end virtual private network (VPN) like resource allocation and dedicated physical resource allocation. The location profile may indicate locations of both the clients and the sources. The QoS profile may comprise a delay tolerance bound, a jitter tolerance bound, packet delivery ratio tolerance, network availability, and/or other QoS related information. The connectivity profile may indicate a point-to-point (P-P) connectivity, a point-to-multipoint (P-MP), a multipoint-to-multipoint (MP-MP), and/or any other connectivity or cast scheme. The directionality profile may indicate a uni-directional communication or a bi-directional communication. The bandwidth profile may indicate the maximum, average, and/or minimum bandwidth requirements for the connectivity, maximum burst rate, maximum burst duration, and/or other bandwidth related information. The duration of service profile may indicate a service time of the application, e.g., once setup. The restoration profile may indicate that a reroute is required, no re-route, and/or other connectivity restoration related information.

Depending on the application, its nature, and related quality of service, the underlying network stratum 420 may have different capabilities. The network stratum 420 may forward its network capability information to the application stratum 410, e.g., in response to receiving a request and/or the application profile. The network capability may comprise bandwidth capabilities, QoS and service level agreement (SLA), configurability, and adaptability. The bandwidth capabilities may indicate the capability of the network to meet bandwidth profile requirements of the application service. The QoS and SLA may indicate the ability of the network to deliver according to the QoS profile requirements and the corresponding SLAs. The configurability may indicate the ability to reconfigure/re-optimize various aspects of the network and the timeliness in which changes can occur. The adaptability information may indicate the ability to adapt changes due to changes of service demand or application/network congestion/failure.

Although FIG. 4 depicts a CSOP scheme 400 in which a user profile is sent to an application stratum, not all embodiments include passing of user profile information. For example, because some applications (e.g., storage backup) do not require user profile information, the CSOP scheme for such applications is strictly between data center to data center (or multiple data centers, depending on the number of backups).

The CSOP communications in any of the architectures or schemes above may comprise vertical communications between the user plane and application stratum and vertical communications between the application stratum and the network stratum. The CSOP functionality may comprise path estimation, path reservation, network topology/virtual machine topology (VMT) query, monitoring/notifying, and/or other functions that are described below. The CSOP may operate over a transmission control protocol (TCP), e.g., using registered TCP ports that may have determined port numbers. However, CSOP operation is not limited to TCP, but may be implemented using other protocols, such as, for example, OpenFlow. As such, all the CSOP messages may be sent via the registered TCP ports. The CSOP may also provide means to guarantee exchanging necessary information to achieve CSO while preventing the sharing of private or secured information, which may not be authorized to other entities, networks, and/or strata. The CSOP may provide the abstraction and summarization mechanisms to avoid revealing unnecessary details (e.g., between the application layer/stratum and the network layer/stratum) and also to provide improved scalability. The abstraction and summarization mechanisms may be provided using CSOP message formats, as described in detail below.

The CSOP messages may comprise an Initialize message, a keep alive (KeepAlive) message, a Request message, a Reply message, a Release message, a Release Configure (ReleaseConf) message, a Notify message, a CSOP error (CSOPErr) message, a CSOP session (CLOSE) message, or combinations thereof. The Initialize massage may be used to initiate a CSOP session with an authentication procedure between an ACG and a NCG. The KeepAlive message may be used to maintain a CSOP session. The Request message may be used to request a path setup from an ACG to a NCG, a path estimation with or without actual reservation/allocation commitment from an ACG to a NCG, and a virtual network topology from an ACG to a NCG. The Reply message may be used in reply to a Request message from a NCG to an ACG. The Release message may be used to request release of any existing paths. It is sent from an ACG to a NCG. The ReleaseConf message may be used in reply to a Release message to confirm release of any existing path. The ReleaseConf message may be sent from a NCG to an ACG. The Notify message may be used to notify any specific event. The Notify message may be either sent by an ACG to a NCG or sent by a NCG to an ACG. When sent by a NCG to an ACG, the Notify message may be used as a monitoring purpose for existing transport services. The CSOPErr message may be used to indicate any protocol error condition associated with CSOP. The CLOSE message may be used to terminate a CSOP session.

Figure 5:
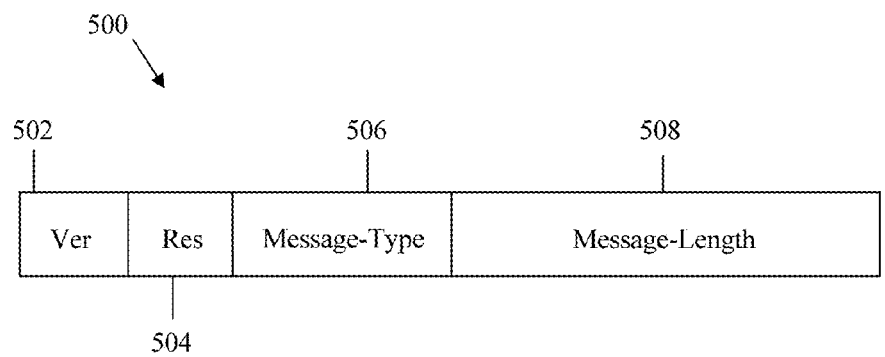
FIG. 5 is a schematic diagram of an embodiment of a CSOP message header.

FIG. 5 illustrates an embodiment of a CSOP message header 500, which may be included in the exchanged CSOP messages. The CSOP message may comprise the CSOP header 500 followed by a variable-length body, which may comprise a set of objects that may be mandatory or optional, as described further below. The CSOP message header 500 may comprise a version field 502, a reserved field 504, a message type field 506, and a message length field 508. The version field 502 may comprise about 3 bits and indicate a CSOP version number. The current version may be version 1. The reserved field 504 may comprise about 5 bits that may be set all to zero and may not be used, e.g., reserved for future use. The message type field 506 may comprise about 8 bits and indicate one of the following defined message types using the corresponding value, as follows:

| Value | Message-Type |
|---|---|
| 1 | Initialize |
| 2 | KeepAlive |
| 3 | Request |
| 4 | Reply |
| 5 | Release |
| 6 | ReleaseConf |
| 7 | Notify |
| 8 | Err |
| 9 | Close |

The message length field 508 may comprise about 16 bits and indicate the total length of the CSOP message including the CSOP message header 500, e.g., in bytes.

For instance, the CSOP message header 500 may be part of a CSOP Request message sent from an ACG to a NCG and part of a CSOP Reply message sent in return from the NCG to the ACG. The Request message may have the following format:

```
<Request Message>::= <Common Header>
    <Authentication Profile>
    <Service Profile>
    [<PerformACG Profile>]
    [<Bandwidth Profile>]
    <Connectivity Mode Profile>
    <Location Profile>
    [<Protection Profile>].
```

The Reply message may have the following format:

```
<Reply Message>::= <Common Header>
    <Authentication Profile>
    <Path>
    <VNT>
```

The Reply message may comprise either <Path> or <VNT> depending on the original service request in the Request message. The CSOP messages may also comprise a set or profiles defined in CSO-framework, which may be understood by the transport layers/networks to provide relevant service request from the ACG. The CSO objects in the CSOP message may be used to carry profile information.

Figure 6:
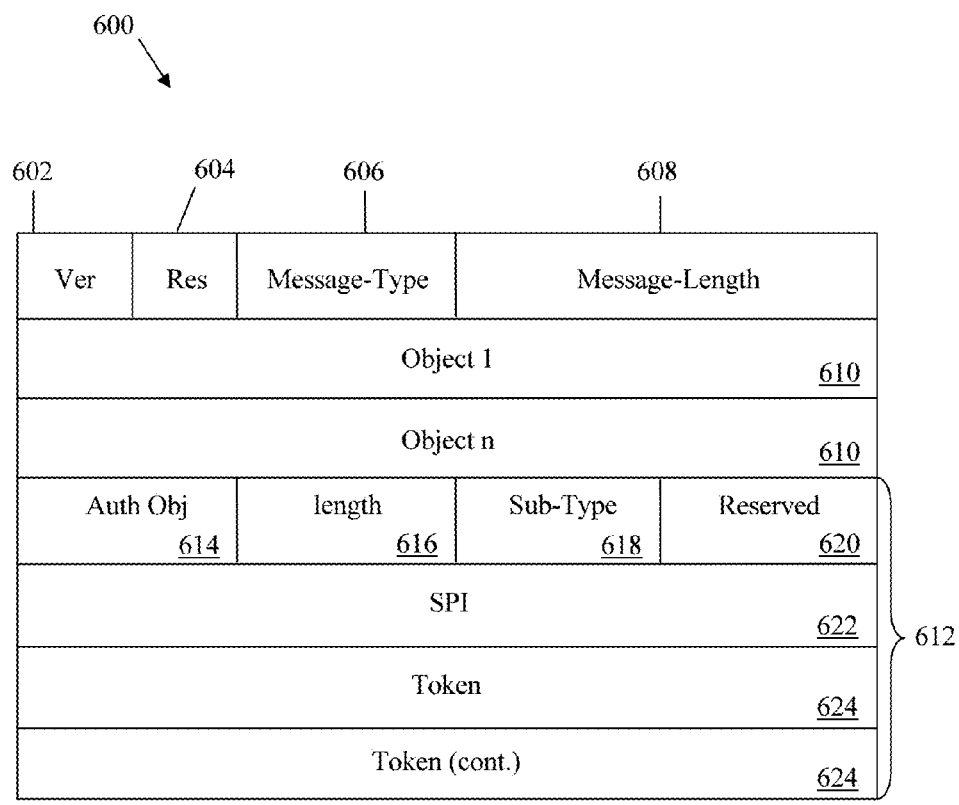
FIG. 6 is a schematic diagram of an embodiment of an authentication profile object.

FIG. 6 illustrates an embodiment of an authentication profile object 612, which may be included in a CSOP message 600. The authentication profile information in the authentication profile object 612 may be provided to secure message exchanges between an ACG and a NCG or between a NCG and another NCG (e.g. in another domain). The CSOP message 600 may comprise a version field 602, a reserved field 604, a message type field 606, and a message length field 608, e.g., in a CSOP message header, which may be configured substantially similar to the corresponding components of the CSOP message header 500. The CSOP message 600 may also comprise one or more other objects 610 in addition to the authentication profile object 612, such as any of the objects described further below. The authentication profile object 612 may be the last object in the CSOP message 600.

The authentication profile object 612 may comprise an authentication object class field 614, a length field 616, a sub-type field 618, a reserved field 620, a Security Parameter Index (SPI) field 622, and a token 624. The authentication object class field 614 may comprise a defined value that indicates that the object is an authentication profile object. The length field 616 may indicate the length of the authentication profile object 612, e.g., in bytes. The sub-type field 618 may identify the mode of authentication and the peer entity to authenticate the message (e.g. ACG-NCG or NCG-NCG, respectively). The reserved field 620 may not be used and all the bits within the reserved field 620 may be set to zero. The SPI field 622 may be a 4-byte number, e.g., in the range [0-4294967296], where the range [0-255] may be reserved. Specifically, the SPI may select the authentication algorithm and shared key used in computing the token 624. To ensure interoperability, an implementation may be able to associate any SPI value with any authentication algorithm. In addition, all implementations may implement a default authentication algorithm, e.g., the Hash-based Message Authentication Code (HMAC)-Secure Hash Algorithm 1 (SHA1). Other algorithms may be allowed.

The token 624 may comprise the information to authenticate the peer entity. The shared-key based security association between ACG and NCG, or between one NCG and another NCG may comprise a SPI, a shared-key, and an authentication algorithm. The shared-key may comprise an arbitrary value and may be about 20 octets in length. The shared-key may be configured manually or through dynamic negotiation. For instance, the token value may be generated as follows: Token=First (96, HMAC-SHA1(Shared key, Message Data)). The message data may be generated as follows: Message Data=source IP address|destination IP address|CSOP message body. The functional form "First (size, input)" used to generate the token value indicates truncation of the "input" data so that only the first "size" bits remain to be used. The CSOP message body used for generating the token value may start from the "Ver" field up to and including SPI value of authentication object.

The ACG may include the authentication profile object 612 in a Request message if the ACG has a shared-key based security association with the NCG. The NCG may include the authentication profile object 612 in a Reply message if the NCG receives the authentication profile object 612 in a corresponding Request message and if the NCG has a shared-key based security association with the ACG. The ACG or NCG receiving the authentication profile object 612 may verify the token value in the token field 624 of the authentication profile object 612. If authentication fails, the NCG may send a Reply message with Status Code CSOP-AUTH-FAIL. If the NCG does not have a shared-key based security association with the ACG, the NCG may discard the Request message. The NCG may also log such events.

Figure 7:
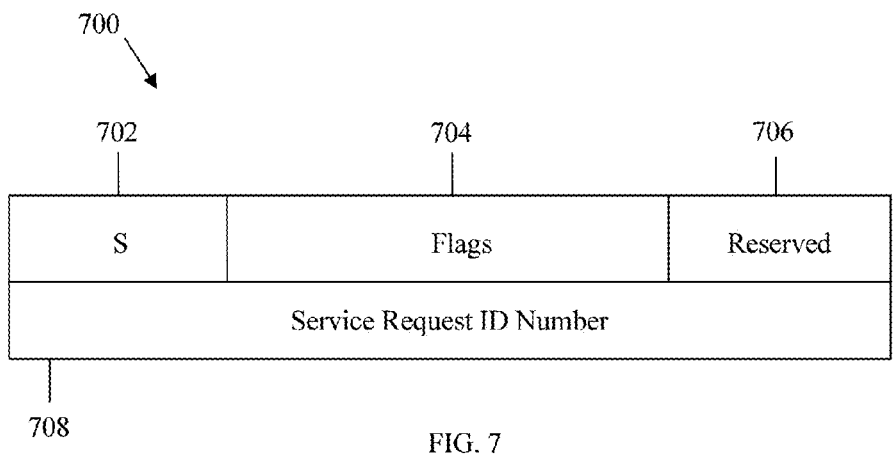
FIG. 7 is a schematic diagram of an embodiment of a service profile object.

FIG. 7 illustrates an embodiment of a service profile object 700 that may be included in a CSO message, e.g., the CSO message 600. The service profile object 700 may be used to indicate a specific service request in a Request message. The following services may be defined by the service profile object 700:

Path Reservation: This service request may require path reservation in a transport network that guarantees bandwidth for the connection.

Path Modification: This service request may be used to indicate modifications for an existing path that has been reserved.

Path Estimation: This service request may be used for a path calculation estimate in a transport network without actual reservation/allocation commitment in the transport network.

VNT Request: This service request may ask for a virtual network topology of the transport network for a given set of source(s) and destination(s).

The service profile object 700 may comprise a service type (S) field 702, a plurality of flags 704, a reserved field 706, and a service request ID number 708. The S field 702 may comprise about 8 bits and may include a value to indicate a service type as follows:

0: Path Reservation
1: Path Modification
2: Path Estimation
3: VNT Request
4-255: Reserved.

The flags 704 may comprise about 16 bits and may be defined for various purposes. The reserved field 706 may comprise about 8 bits that may be set to zero on transmission and ignored on reception. The service request ID number 708 may comprise about 32 bits and may comprise a value that uniquely identifies the service request. Each time a new request is sent to a NCG, the service request ID number may be incremented.

Figure 8:
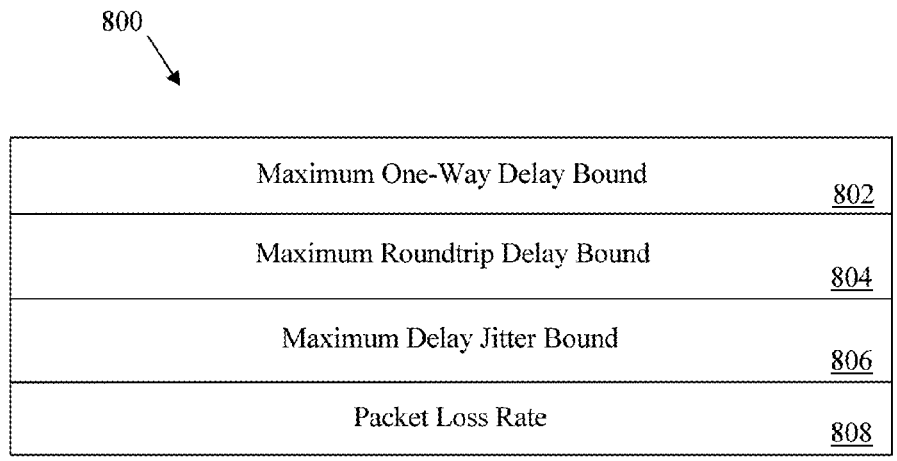
FIG. 8 is a schematic diagram of an embodiment of a performance profile object.

FIG. 8 illustrates an embodiment of a performance profile object 800 that may be included in a CSO message, e.g., the CSO message 600. The performance profile object 800 may indicate the desired performance objective associated with a reservation request. The performance profile object 800 may comprise a maximum one-way delay bound field 802, a maximum roundtrip delay bound field 804, a maximum delay jitter bound field 806, and a packet loss rate field 808. The maximum one-way delay bound field 802 may comprise about 32 bits and indicate the requested maximum one-way delay bound or limit, which may be encoded in 32 bits in the Institute of Electrical and Electronics Engineers (IEEE) floating point format and expressed in millisecond. The maximum roundtrip delay bound field 804 may comprise about 32 bits and indicate the requested maximum roundtrip delay bound or limit, which may be encoded in 32 bits in IEEE floating point format and expressed in millisecond. The maximum delay jitter bound field 806 may comprise about 32 bits and indicate the requested maximum delay jitter bound or limit, which may be encoded in 32 bits in IEEE floating point format and expressed in millisecond. The packet loss rate field 808 may comprise about 32 bits and indicate the requested packet loss rate, which may be encoded in 32 bits in IEEE floating point format and expressed in percentage.

Figure 9:
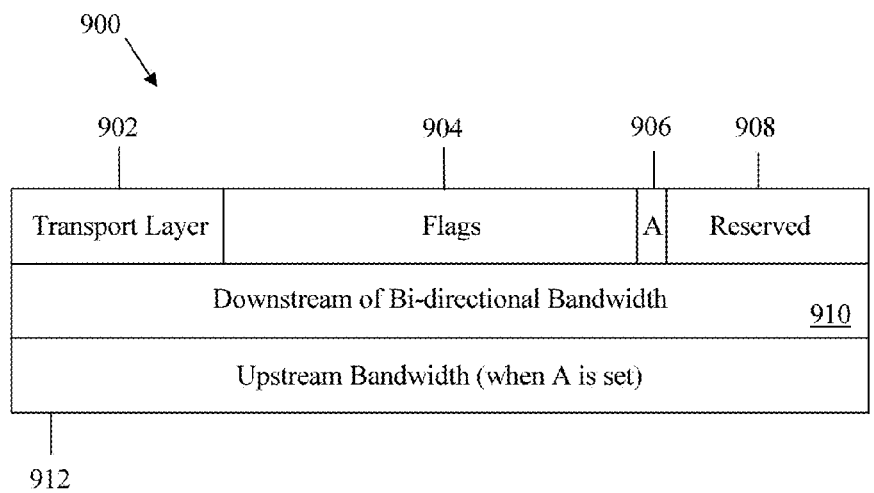
FIG. 9 is a schematic diagram of an embodiment of a bandwidth profile object.

FIG. 9 illustrates an embodiment of a bandwidth profile object 900 that may be included in a CSO message, e.g., the CSO message 600. The bandwidth profile object 900 may be used to specify the required bandwidth for a path (e.g., a label switched path (LSP)). The bandwidth profile object 900 may comprise a transport layer field 902, a plurality of flags 904, an asymmetric bandwidth indicator (A) bit 906, a reserved field 908, a downstream of bi-directional bandwidth field 910, and an upstream bandwidth field 912.

The transport layer field 902 may comprise about 8 bits and may be set to 0 to indicate that the transport layer is not specified by ACG. Otherwise, this field may be encoded in the "LSP Encoding Type" format as defined in Resource Reservation Protocol (RSVP)-Traffic Engineering (TE) and may be used by ACG to specify which transport layer to set up the path. The flags 904 may comprise about 16 bits and may be defined for various purposes. The A bit 906 may comprise about 1 bit and may be set to indicate that the connection is bi-directional with asymmetric bandwidth. The reserved field 908 may not be used and may be set to zero. The downstream of bi-directional bandwidth field 910 may comprise about 32 bits and may indicate the requested downstream (i.e., from source to destination) bandwidth in the case when the A bit 906 is set or the connection is uni-directional, or may indicate the requested bi-directional bandwidth in other cases. The upstream bandwidth field 912 may comprise about 32 bits and may indicate the requested upstream (i.e., from destination to source) bandwidth. The upstream bandwidth field 912 may be included or used only when the A bit 906 is set. The downstream of bi-directional bandwidth field 910 and upstream bandwidth field 912 may be both encoded in 32 bits in IEEE floating point format and expressed in bytes per second.

Figure 10:
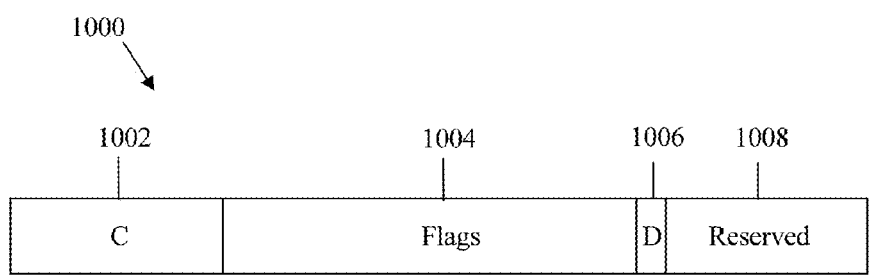
FIG. 10 is a schematic diagram of an embodiment of a connectivity mode profile object.

FIG. 10 illustrates an embodiment of a connectivity mode profile object 1000 that may be included in a CSO message, e.g., the CSO message 600. The connectivity mode profile object 1000 may be used to specify the type of connection associated with the path request. The following connectivity types are defined: P-P, P-MP, MP-MP, and Anycast (Multi-destination). The connectivity mode profile object 1000 may comprise a connectivity (C) field 1002, a plurality of flags 1004, a directionality (D) bit 1006, and a reserved field 1008.

The C field 1002 may comprise about 8 bits and may comprise a value that indicates one of the connectivity types as follows:
  0: P-P
  1: P-MP
  2: MP-MP
  3: Anycast (Multi-destination)
  4-255: Reserved.
The flags 1004 may comprise about 16 bits and may be defined for various purposes. The D bit 1006 may comprise about 1 bit that may be set to indicate that the connection is uni-directional. The reserved field 1008 may comprise about 8 bits that may be set to zero on transmission and ignore on reception.

Figure 11:
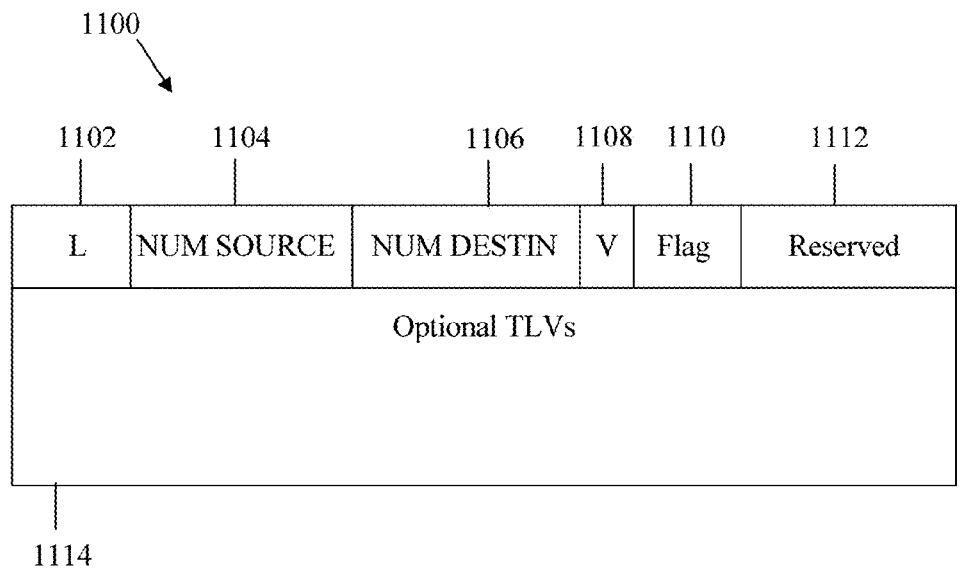
FIG. 11 is a schematic diagram of an embodiment of a location profile object.

FIG. 11 illustrates an embodiment of a location profile object 1100 that may be included in a CSO message, e.g., the CSO message 600. The location profile object 1100 may be used to indicate the IP addresses of the corresponding application layer resources (e.g., servers, storage, etc.), e.g., for each of the connectivity modes defined in connectivity mode profile object 1000. For instance, the location profile object 1100 may indicate one of the Origin and Destination for P-P, the Origin and Set of Destinations for P-MP, the Set of Origins and Destination for MP-P, the Set of Origins and Set of Destinations for MP-MP, and the Set of Candidate Destinations for Anycast or Multi-Destination. The location profile object 1100 may comprise a location profile (L) field 1102, a number of sources field 1104, a number of destinations field 1106, a version of IP protocol (V) field 1108, a plurality of flags 1110, a reserved field 1112, and one of more optional TLVs 1114.

The L field 1102 may comprise about 4 bits and indicate a value based on the connectivity mode or type as follows:
  0: P-P
  1: P-MP
  2: MP-P
  3: MP-MP
  4: Anycast (Multi-destination)
  5-15: Reserved.
The number of sources field 1104 may comprise about 8 bits and indicate the number of sources. The number of destinations field 1106 may comprise about 8 bits and indicate the number of destinations. The V field 1108 may comprise about 2 bits and indicate the version of the IP protocol. For instance, the V field 1108 may be set to zero in the case of IP version 4 (IPv4) or to 1 in the case of IP version 6 (IPv6). The flags 1110 may comprise about 4 bits and may be defined for various purposes. The reserved field 1112 may comprise about 16 bits that may be set to zero on transmission and ignored on reception. The optional TLVs 1114 may be used to indicate the IP addresses associated with the location profile, as described in more detail below.

Figure 12:
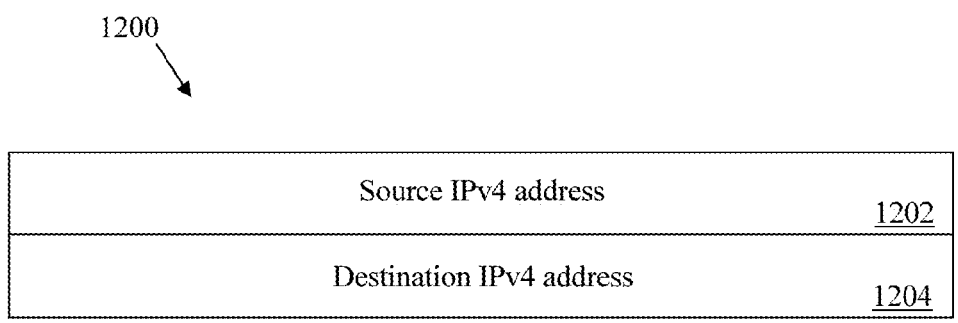
FIG. 12 is a schematic diagram of an embodiment of an optional Type/Length/Value (TLV).
Figures 13, 14:
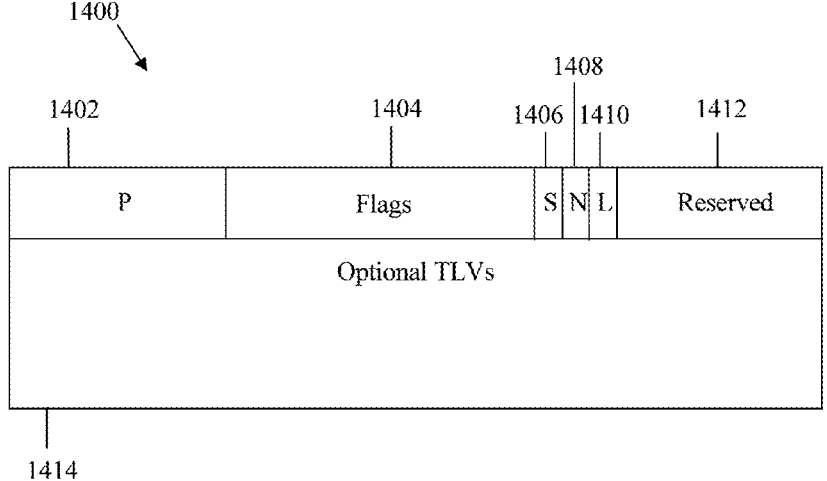
FIG. 13 is a schematic diagram of another embodiment of an optional TLV.
FIG. 14 is a schematic diagram of an embodiment of a protection profile object.

FIG. 12 illustrates an embodiment of an optional TLV 1200 that may be used in the location profile object 1100, for instance when the L field 1102 is set to 0 (e.g., in the case of P-P), and the V field 1108 is set to 0 (e.g., in the case of IPv4). The optional TLV 1200 may comprise a source IPv4 address field 1202 that indicates the IPv4 address of the source, and a destination IPv4 address field 1204 that indicates the IPv4 address of the destination. FIG. 13 illustrates an embodiment of another optional TLV 1300 that may be used in the location profile object 1100, for instance when the L field 1102 is set to 1 (e.g., in the case of P-MP), the number of destinations field 1106 is set to 4, and the V field 1108 is set to 0 (e.g., in the case of IPv4). The optional TLV 1300 may comprise a source IPv4 address field 1302 that indicates the IPv4 address of the source, and four destination IPv4 address fields 1304 that each indicates the IPv4 address of one of the 4 destinations. Similarly, other optional TLVs 1114 may be used for other cases. In the cases where the V field 1108 is set to 1 (e.g., in the case of IPv4), each IPv6 address may comprise about 16 bytes.

FIG. 14 illustrates an embodiment of a protection profile object 1400 that may be included in a CSO message, e.g., the CSO message 600. The protection profile object 1400 may be used to indicate the level of protection required for a path reservation request. The levels of protection may include no protection, 1+1 protection, and shared protection. In the case of 1+1 protection and shared protection, the protection profile object 1400 may indicate the protection path differential from the engineered path, such as in terms of delay, hops, distance, etc. The protection profile object 1400 may comprise a protection level (P) field 1402 and a plurality of flags 1404, which may include a shared list link group (SRLG) diversity (S) bit 1406, a node diversity (N) bit 1408, and a link diversity (L) bit 1410. The protection profile object 1400 may also comprise a reserved field 1412 and one or more optional TLVs 1414.

The P field 1402 may comprise about 8 bits and indicate a value associated with a protection level as follows:
  0: No Protection
  1: 1+1
  2: Shared Protection
  3-255: Reserved.
The flags 1404 may comprise about 16 bits and may be used for different purposes. Specifically, the S bit 1406 may be set when the protection path is required to be SRLG diverse from the engineered path for 1+1 or shared protection. The N bit 1408 may be set when the protection path is required to be node diverse from the engineered path for 1+1 or shared protection. The L bit 1410 may be set when the protection path is required to be link diverse from the engineered path for 1+1 or shared protection. The reserved field 1412 may comprise about 8 bits that may be set to zero on transmission and ignored on reception. The optional TLVs 1414 may be used to indicate the protection path differential from the engineered path, e.g., in terms of delay, hop counts, and distance, as described below. The optional TLV field(s) 1414 may be populated when the P field 1402 is set to either 1 or 2.

Figure 15:
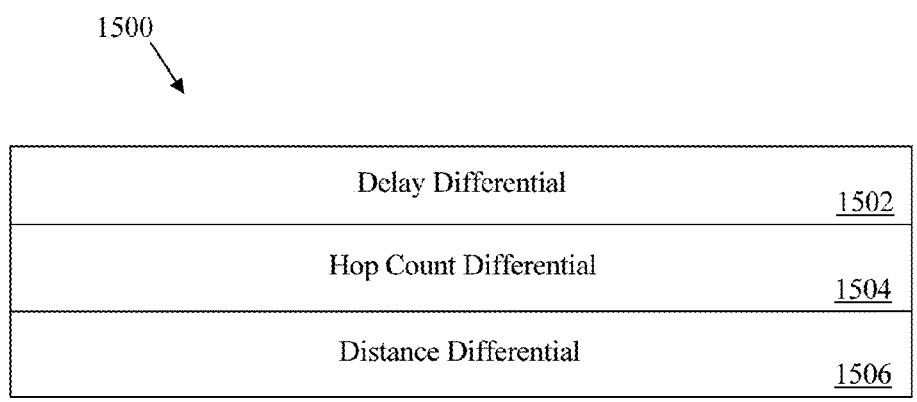
FIG. 15 is a schematic diagram of another embodiment of an optional TLV.

FIG. 15 illustrates an embodiment of an optional TLV 1500 that may be used in the protection profile object 1400, for instance when the P field 1402 is set to 1 or 2. The optional TLV 1500 may comprise a delay differential field 1502, a hop count differential field 1504, and a distance differential field 1506. The delay differential field 1502 may comprise about 32 bits and may be encoded in IEEE floating point format expressed in percentage. The delay differential field 1502 may indicate the protection path delay differential from the engineered path. For instance, a value of 50% may indicate that the protection path is allowed to have no more than 50% delay than the engineered path. The hop count differential field 1504 may comprise about 32 bits and may be encoded in IEEE floating point format expressed in percentage. The hop count differential field 1504 may indicate the protection path hop count differential from the engineered path. The distance differential field 1506 may comprise about 32 bits and may be encoded in IEEE floating point format expressed in percentage. The distance differential field 1506 may indicate the protection path distance differential from the engineered path.

Figure 16:
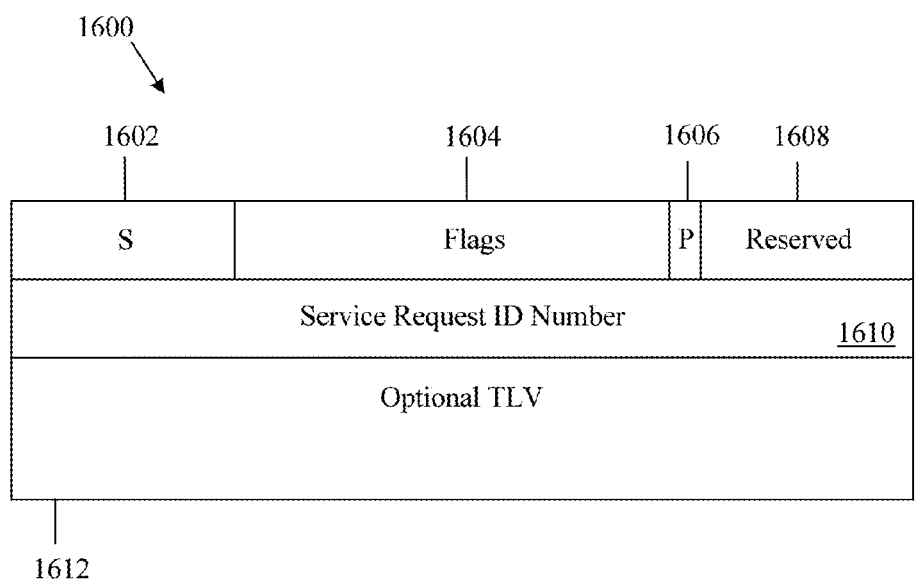
FIG. 16 is a schematic diagram of an embodiment of a path object.

FIG. 16 illustrates an embodiment of a path object 1600 that may be included in a CSO message, e.g., the CSO message 600. The path object 1600 may be used to provide the path information in reply to an original path estimation or path reservation/modification request in a Request message. The path object 1600 may be included in a Reply message. The path object 1600 may comprise a service type (S) field 1602, a plurality of flags 1604 which may include a protection (P) bit 1606, a reserved field 1608, a service request ID number 1610, and at least one optional TLV 1612.

The S field 1602 may comprise about 8 bits and have a value that indicates a service type, as follows:
  0: Path Reservation
  1: Path Modification
  2: Path Estimation.

The flags 1604 may comprise about 16 bits and may be used for different purposes. Specifically, the P bit 1606 may be set to indicate that the path is a protection path. The P bit 1606 may be used when the S field 1602 is set to 0 (to indicate a path reservation service type). The reserved field 1608 may comprise about 8 bits that may be set to zero on transmission and ignored on reception. The service request ID number 1610 may comprise about 32 bits and indicate a service request ID number that may be supplied in the service profile object 700 in a Request message. The service request ID number may identify the original path request. The content of the optional TLV 1612 may vary depending on the S field 1602, as described below.

Figure 17:
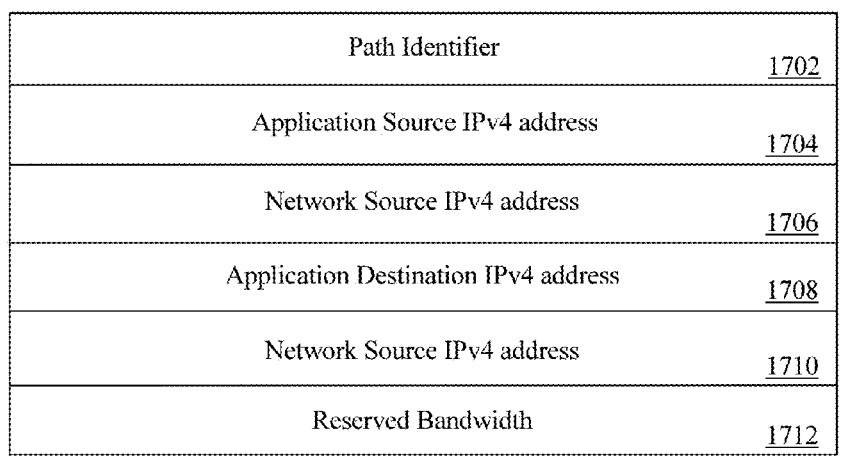
FIG. 17 is a schematic diagram of another embodiment of an optional TLV.

FIG. 17 illustrates an embodiment of an optional TLV 1700 that may be used in the path object 1600, for instance when the S field 1602 is set to 0. The optional TLV 1700 may comprise a path identifier field 1702, an application source IPv4 address 1704, a network source IPv4 address 1706, an application destination IPv4 address 1708, a network source IPv4 address 1710, and a reserved bandwidth 1712. The identifier field 1702 may comprise about 32 bits and identify the path reserved in a transport network. The identifier field 1702 may be assigned by the NCG. The reserved bandwidth 1712 may indicate a bandwidth for a reserved path.

Figure 18:
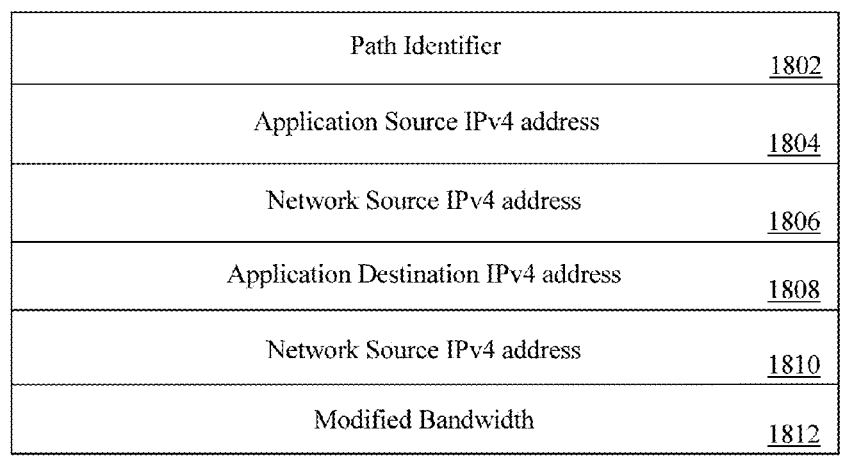
FIG. 18 is a schematic diagram of another embodiment of an optional TLV.

FIG. 18 illustrates an embodiment of another optional TLV 1800 that may be used in the path object 1600, for instance when the S field 1602 is set to 1. The optional TLV 1800 may comprise a path identifier field 1802, an application source IPv4 address 1804, a network source IPv4 address 1806, an application destination IPv4 address 1808, a network source IPv4 address 1810, and a modified bandwidth 1812. The identifier field 1802 may be configured substantially similar to the identifier field 1702. The modified bandwidth 1812 may indicate a bandwidth for a modified path.

FIG. 19 illustrates an embodiment of another optional TLV 1900 that may be used in the path object 1600, for instance when the S field 1602 is set to 2. The optional TLV 1900 may comprise a path identifier field 1902, an application source IPv4 address 1904, a network source IPv4 address 1906, an application destination IPv4 address 1908, a network source IPv4 address 1910, and an estimated bandwidth 1912. The identifier field 1902 may be configured substantially similar to the identifier field 1702. The modified bandwidth 1912 may indicate a bandwidth for an estimated path.

FIG. 20 illustrates an embodiment of a VNT object 2000 that may be included in a CSO message, e.g., the CSO message 600. The VNT object 2000 may be used to provide the abstraction of topology in reply to an original VNT request. The information pertaining to the original VNT request may be carried through the location profile object 1100 and the service profile object 700 in a Request message. The VNT object 2000 may supply a service request ID associated with an original request and virtual network topology information (e.g., the available bandwidth) for each requested location profile. The location profile supplied in the original VNT request may comprise IP addresses of the application locations. In reply to such request, the VNT object 2000 in a Reply message may provide the original application location ID and its corresponding network node ID (e.g., IP addresses) to allow the ACG to consult the provided information from the NCG. The VNT is defined herein as the available bandwidth for a given node pair.

The VNT object 2000 may comprise a L field 2002, a number of sources field 2004, a number of destinations field 2006, a V field 2008, a plurality of flags 2010, and a reserved field 2012, which may be configured substantially similar to the L field 1102, the number of sources field 1104, the number of destinations field 1106, the flags 1110, and the reserved field 1112, respectively. The VNT object 2000 may also comprise a service request ID number 2014 and one or more optional TLVs 2016. The service request ID number 2014 may comprise about 32 bits and indicate the service request ID number value that uniquely identifies the original service request supplied in the service profile object 700 in a Request message. The optional TLVs 2016 may be used to provide detailed VNT information, as described in more detail below.

Figure 21:
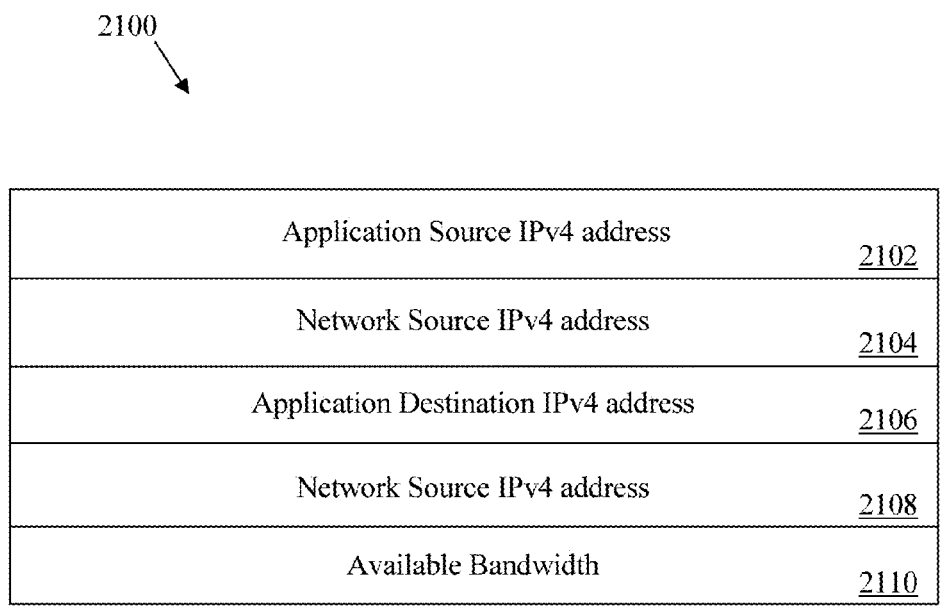
FIG. 21 is a schematic diagram of another embodiment of an optional TLV.

FIG. 21 illustrates an embodiment of an optional TLV 2100 that may be used in the VNT object 2000, for instance when the L field 2002 is set to 0 (e.g., in the case of P-P), and the V field 2008 is set to 0 (e.g., in the case of IPv4). The optional TLV 2100 may comprise an application source IPv4 address field 2102, a network source IPv4 address field 2104, an application destination IPv4 address field 2106, a network source IPv4 address field 2108, and an available bandwidth field 2110. FIG. 22 illustrates an embodiment of another optional TLV 2200 that may be used in the VNT object 2000, for instance when the L field 2002 is set to 1 (e.g., in the case of P-MP), and the V field 2008 is set to 0 (e.g., in the case of IPv4). The optional TLV 2200 may comprise a first application source (#1) IPv4 address field 2202, a first network source (#1) IPv4 address field 2204, a first application destination (#1) IPv4 address field 2206, a first network source (#1) IPv4 address field 2208, and a first available bandwidth field 2210. Additionally, the optional TLV 2200 may comprise a second application source (#2) IPv4 address field 2212, a second network source (#2) IPv4 address field 2214, a second application destination (#2) IPv4 address field 2216, a second network source (#2) IPv4 address field 2218, and a second available bandwidth field 2220.

Figure 23:
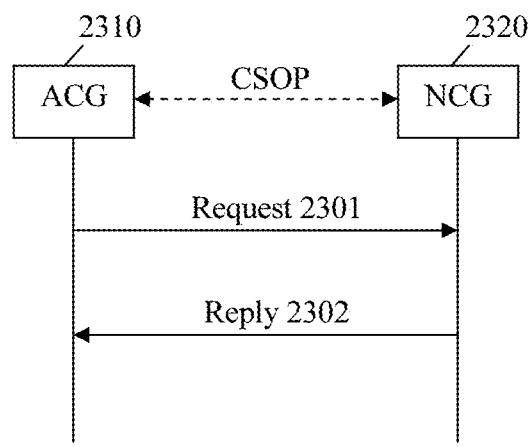
FIG. 23 is a protocol diagram of an embodiment of a CSOP message exchange.

FIG. 23 illustrates an embodiment of a CSOP message exchange 2300 that may be established between an ACG 2310 and a NCG 2320 using the CSO interface and CSOP. The ACG 2310 may first send a Request message 2301, which may comprise at least some of the objects and optional TLVs described above, to the NCG 2320. The NCG 2320 may receive and process the Request message 2301 and then send back a Reply message 2302 to the ACG 2310. The Reply message 2302 may comprise at least some of the objects and optional TLVs, as described above. In other embodiments, the ACG 2310 and NCG 2320 may exchange other CSO messages, such as an Initialize message, a KeepAlive message, a Release message, a ReleaseConf message, a Notify message, a CSOPErr message, a CLOSE message, or combinations thereof. In such embodiments, the CSOP message exchange 2300 may be initiated by the ACG 2310 or the NCG 2320.

Figure 24:
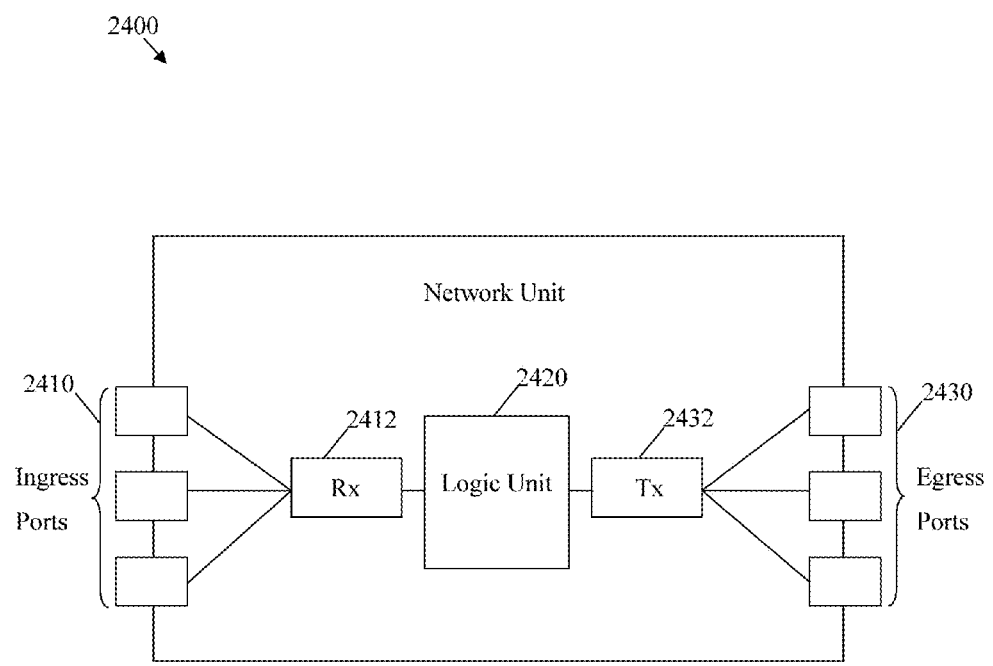
FIG. 24 is a schematic diagram of an embodiment of a network unit.

FIG. 24 illustrates an embodiment of a network unit 2400, which may be any device that transports and processes data through the network. The network unit 2400 may comprise one or more ingress ports or units 2410 coupled to a receiver (Rx) 2412 for receiving signals and frames/data from other network components. The network unit 2400 may comprise a logic unit 2420 to determine which network components to send data to. The logic unit 2420 may be implemented using hardware, software, or both. The network unit 2400 may also comprise one or more egress ports or units 2430 coupled to a transmitter (Tx) 2432 for transmitting signals and frames/data to the other network components. The receiver 2412, logic unit 2420, and transmitter 2432 may also implement or support the CSOP scheme 400 and the CSOP message exchange 2300. The components of the network unit 2400 may be arranged as shown in FIG. 24.

Figure 25:
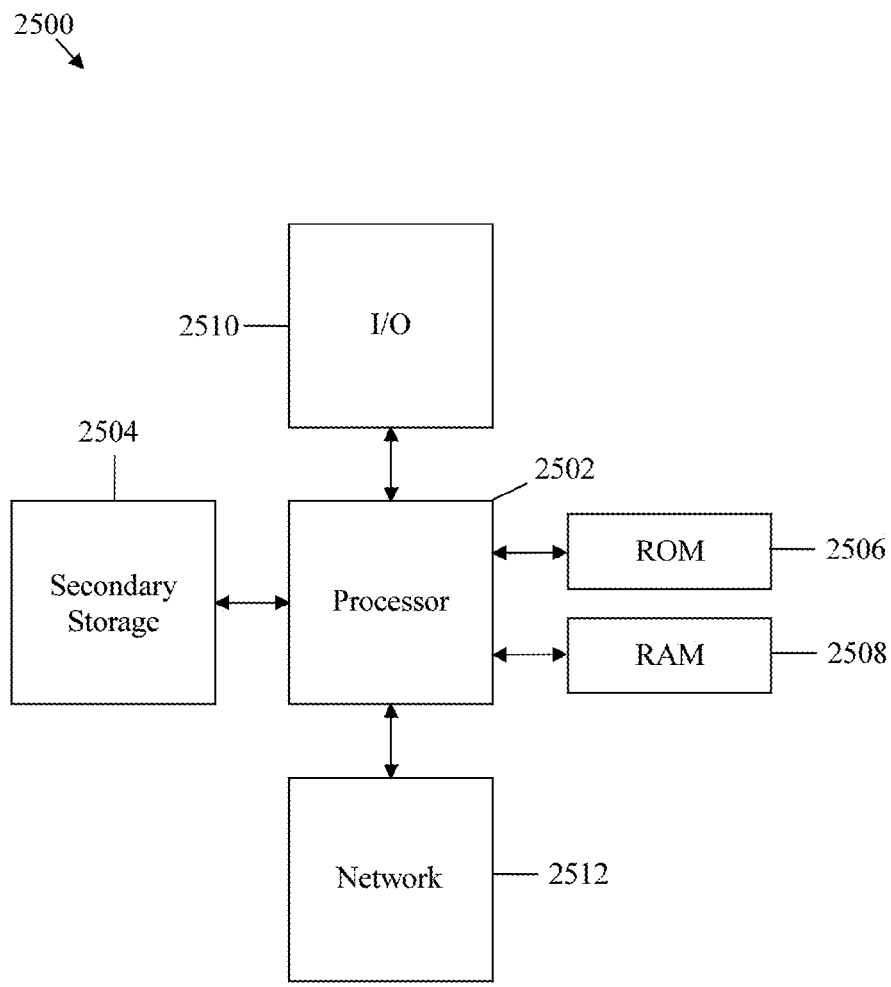
FIG. 25 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 25 illustrates a typical, general-purpose network component 2500 suitable for implementing one or more embodiments of the components disclosed herein. The network component 2500 includes a processor 2502 (which may be referred to as a central processor unit or CPU) that is in communication with memory devices including secondary storage 2504, read only memory (ROM) 2506, RAM 2508, input/output (I/O) devices 2510, and network connectivity devices 2512. The processor 2502 may be implemented as one or more CPU chips, or may be part of one or more application specific integrated circuits (ASICs).

The secondary storage 2504 is typically comprised of one or more disk drives or tape drives and is used for non-volatile storage of data and as an over-flow data storage device if RAM 2508 is not large enough to hold all working data. Secondary storage 2504 may be used to store programs that are loaded into RAM 2508 when such programs are selected for execution. The ROM 2506 is used to store instructions and perhaps data that are read during program execution. ROM 2506 is a non-volatile memory device that typically has a small memory capacity relative to the larger memory capacity of secondary storage 2504. The RAM 2508 is used to store volatile data and perhaps to store instructions. Access to both ROM 2506 and RAM 2508 is typically faster than to secondary storage 2504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method comprising:
sending a resource query from a service stratum gateway with a hardware processor to a transport stratum gateway via a cross-stratum optimization (CSO) interface using a cross-stratum optimization protocol (CSOP) between the service stratum gateway and the transport stratum gateway to enable the different functionalities of the application cross-stratum gateway (ACG) and network CSO gateway (NCG) for related communications, including signaling, messaging, and information exchange,
wherein the service stratum gateway collectively handles communications from a plurality of servers managing applications in a service stratum and the transport stratum gateway collectively handles CSOP communications from a plurality of network nodes managing a transport network wherein the CSOP communications include CSO messages that comprise path estimation, path reservation, network topology or virtual machine topology query;
exchanging status data for monitoring, controlling, and managing the transport network across the cross-stratum optimization (CSO) interface for provisioning application, network congestion, failure information utilizing at least bandwidth profile object used to specify the required bandwidth for a path and comprises a transport layer field, a plurality of flags, an asymmetric bandwidth indicator bit, a reserved field, a downstream of bi-directional bandwidth field, and an upstream bandwidth field; and
transmitting a reservation request from the service stratum gateway to the transport stratum gateway via the cross-stratum optimization (CSO) interface to reserve a guaranteed bandwidth across the transport network, the service stratum gateway and the transport stratum gateway being at least partially implemented in hardware, the reservation request including a path object having a type length value (TLV) field, the TLV field carrying a path identifier identifying a path to be reserved.

2. The method of claim 1, wherein the resource query comprises a source, a destination, a bandwidth, a maximum latency, and a maximum jitter.

3. The method of claim 1, wherein the reservation request comprises a service profile indicating a quality of service (QoS) an application requires of the transport network.

4. The method of claim 1, further comprising receiving a Keep Alive message at the service stratum gateway from the transport stratum gateway.

5. The method of claim 1, wherein the reservation request is sent to setup a new path in a transport stratum or modify an existing path in the transport stratum.

6. The method of claim 5, wherein the resource query is sent to get a status of resources in the transport stratum to perform a cross stratum optimization calculation.

7. The method of claim 6, further comprising receiving a response message at the service stratum gateway from the transport stratum gateway in response to the resource query, the response message comprising a status of resources in the transport stratum.

8. The method of claim 1, wherein the reservation request comprises a service profile object generated in the service stratum and indicating data related to the request.

9. The method of claim 8, wherein the reservation request comprises an object indicating a requested bandwidth.

10. The method of claim 8, wherein the reservation request comprises an object indicating a bi-directional path constraint.

11. The method of claim 8, wherein the reservation request comprises an object indicating a unidirectional path constraint.

12. The method of claim 8, wherein the reservation request comprises an object indicating a request for a 1+1 protection across a transport stratum.

13. The method of claim 8, wherein the reservation request further comprises performance constraint object indicating constraints for the reservation request.

14. The method of claim 13, wherein the performance constraint object indicates a jitter bound for the request.

15. The method of claim 13, wherein the performance constraint object indicates a latency delay bound.

16. A service stratum gateway comprising:
a transmitter configured to send a resource query to a transport stratum gateway via a cross-stratum optimization (CSO) interface using a cross-stratum optimization protocol (CSOP) between the service stratum gateway and the transport stratum gateway, wherein the service stratum gateway collectively handles communications from a plurality of servers managing applications in a service stratum and the transport stratum gateway collectively handles CSOP communications from a plurality of network nodes managing a transport network, wherein the CSOP communications involving CSO messages that comprise path estimation, path reservation, network topology or virtual machine topology query;
a receiver configured to receive status data for monitoring, controlling, and managing the transport network across the cross-stratum optimization (CSO) interface for provisioning application, network congestion, failure information utilizing at least bandwidth profile object used to specify the required bandwidth for a path and comprises a transport layer field, a plurality of flags, an asymmetric bandwidth indicator bit, a reserved field, a downstream of bi-directional bandwidth field, and an upstream bandwidth field; and
a hardware processor coupled to the transmitter and receiver and configured to cause the transmitter to transmit a reservation request to the transport stratum gateway via the cross-stratum optimization (CSO) interface to reserve a guaranteed bandwidth across the transport network, the reservation request including a path object having a type length value (TLV) field, the TLV field carrying a path identifier, identifying a path to be reserved in the transport network.

17. The service stratum gateway of claim 16, wherein the reservation request is sent to setup a new path in a transport stratum or modify an existing path in the transport stratum.

18. The service stratum gateway of claim 16, wherein the resource query is sent to get a status of resources in a transport stratum to perform a cross stratum optimization calculation.

19. The service stratum gateway of claim 16, wherein the receiver is further configured to receive a response message from the transport stratum gateway via the interface in response to the resource query, the response message comprising a status of resources in a transport stratum.

20. The service stratum gateway of claim 16, wherein the resource query comprises a source, a destination, a bandwidth, a maximum latency, and a maximum jitter.

\* \* \* \* \*